(12) United States Patent
Fonov et al.

(10) Patent No.: US 7,127,950 B2
(45) Date of Patent: Oct. 31, 2006

(54) METHOD FOR DETERMINING A SURFACE CONTACT FORCE

(75) Inventors: Sergey D. Fonov, Kettering, OH (US); E. Grant Jones, Troy, OH (US); Jim W. Crafton, Fairborn, OH (US)

(73) Assignee: Innovative Scientific Solutions, Inc., Dayton, OH (US)

( * ) Notice: Subject to any disclaimer, the term of this patent is extended or adjusted under 35 U.S.C. 154(b) by 14 days.

(21) Appl. No.: 10/981,927

(22) Filed: Nov. 5, 2004

(65) Prior Publication Data

US 2005/0115331 A1 Jun. 2, 2005

Related U.S. Application Data

(60) Provisional application No. 60/517,513, filed on Nov. 5, 2003.

(51) Int. Cl.
*G01L 1/24* (2006.01)
*G01B 11/16* (2006.01)

(52) U.S. Cl. ............... 73/800; 73/762; 73/841
(58) Field of Classification Search ........... 73/800, 73/762, 841, 862.324
See application file for complete search history.

(56) References Cited

U.S. PATENT DOCUMENTS

| | | | |
|---|---|---|---|
| 5,186,046 A | 2/1993 | Gouterman et al. | |
| 5,341,676 A | 8/1994 | Gouterman et al. | |
| 6,327,030 B1 | 12/2001 | Ifju et al. | |
| 6,681,618 B1* | 1/2004 | Hajduk et al. | 73/54.37 |
| 6,717,172 B1* | 4/2004 | Gharib et al. | 250/574 |
| 6,943,869 B1* | 9/2005 | Hubner et al. | 356/34 |

FOREIGN PATENT DOCUMENTS

| | | |
|---|---|---|
| RU | 2089864 C1 | 9/1997 |
| RU | 2112228 C1 | 5/1998 |
| RU | 2159925 C1 | 11/2000 |
| RU | 2211441 C2 | 8/2003 |
| SU | 1065452 A | 7/1984 |
| SU | 1633950 A1 | 1/1994 |
| SU | 1822252 A1 | 6/1996 |

OTHER PUBLICATIONS

Peterson, J.I. et al., "New Technique of Surface Flow Visualization Based on Oxygen Quenching of Fluorescence," Rev. Sci. Instrum. 51(5):670-671, 1980.

Mosharov V, Radchenko V, Fonov S., Luminescent Pressure Sensors in Aerodynamic Experiments. Moscow: Cent. Aerohydrodyn. Inst. (TsAGI). CWA Int. Corp. 1997 151 pp.

(Continued)

*Primary Examiner*—Edward Lefkowitz
*Assistant Examiner*—Freddie Kirkland, III
(74) *Attorney, Agent, or Firm*—Stevens & Showalter LLP

(57) ABSTRACT

A method of measuring a load on a surface produced by a contact force. An elastic film or coating is located on a supporting surface to provide an indication of normal and tangential or shear forces applied to the surface. A thickness measurement, corresponding to a normal displacement, and a tangential displacement of the film, corresponding to a shear displacement, is obtained and input to a response function to reconstruct the normal and shear load components of the contact force on the surface. A differential thickness measurement of the film is detected by an optical method in which a luminescent output from a luminophore in the film is measured. A luminescent output from a reference luminophore located below the film is also measured to provide a measurement system independent of the illumination source used to produce the luminescent output.

27 Claims, 10 Drawing Sheets

OTHER PUBLICATIONS

Hidrovo C.H., Hart, D.P., "Emission reabsorption laser induced fluorescence (ERLIF) film thickness measurements," Meas. Sci. Technol, 12(2001) 467-477.

Inagaki H. et al., Measurement of Oil Film Thickness Distribution on Piston Surface Using the Fluoresence Method (Development of Measurement System) JSME Int. J B40, 487-493, 1997.

Bell, James H., Schairer, Edward T., Hand, Lawrence A., Mehta, Rabindra D., "Surface Pressure Measurements Using Luminescent Coatings," Annual Rev. Fluid Mech. 2001. 33:155-206.

Fonov, S.D., Pressure Sensitive Paint for Oscillating Pressure Field Measurements, Presented at ICIASF 1999, Toulousse, France.

Tarasov, V., Fonov, S., Morozov, A., "New gauges for direct skin friction measurements." Proc. of 17th International Congress on Instrumentation in Aerospace Simulation Facilities (ICIASF), Monterey, California, Sep. 29 to Oct. 2, 1997.

Braess, D. "Finite Elements," Second Edition, Cambridge Uniersity Press, 2001.

Landau, L.D., Lifshitz, E.M., "Course of Theoretical Physics: Theory of Elasticity," vol. 7 Butterworth-Heinemann, 1995, 260 pp.

Barlow, Jewel B., Rae, William H., Pope, Alan, "Low-Speed Wind Tunnel Testing," John Wiley & Sons, Inc., 1999, 800 pp.

* cited by examiner $\mu$ = 117.101 Pa
$\sigma$ = 2.549 x $10^{-6}$ m
offset = 2.327 x $10^{-6}$ m $\mu$ = 1.279 x $10^3$ Pa
$\sigma$ = 6.62 x $10^{-7}$ m
offset = 4.003 x $10^{-6}$ m

METHOD FOR DETERMINING A SURFACE CONTACT FORCE

CROSS-REFERENCE TO RELATED APPLICATIONS

This application claims the benefit of U.S. Provisional Application No. 60/517,513, filed Nov. 5, 2003, which is incorporated herein by reference.

BACKGROUND OF THE INVENTION

1. Field of the Invention

The present invention relates generally to surface-pressure and shear-tension measurements and, more particularly, relates to surface-pressure and shear-tension measurements based on the deformation of an elastic film located in association with the surface of an object or model.

2. Description of Prior Art

Convenient, reliable and inexpensive methods for determining pressure maps of surfaces, particularly on aerodynamic objects, are currently under development. One known approach is to employ pressure taps which are drilled into the surface under study and connected via tubing to multiplexed pressure gages or pressure gage arrays. Hundreds of pressure taps are generally required to get a pressure distribution over an entire surface. Even then, the significant distance between taps usually requires additional sophisticated interpolation procedures. Pressure taps provide information only about the static or normal pressure component acting on the surface. Tangential pressure components or shear stresses should also be measured to fully characterize the forces acting on the surface. Up to now these components have been measured mostly by indirect approaches such as heat flux measurements, by miniature balance systems imbedded into the object or model surface, or by measuring the shear force acting on a floated piece of the model surface.

An additional technique proposed utilizing the oxygen quenching of fluorescent dyes for flow visualization. Since then a substantial effort has gone into the development of the Pressure Sensitive Paint (PSP) technique which is a quantitative surface pressure measurement method. The PSP technique is based on the oxygen quenching of molecular photoluminescence. A surface under study is covered by an oxygen-permeable thin polymeric layer containing an embedded oxygen sensitive luminophore. Oxygen from the ambient flow can diffuse into the polymeric layer where its concentration is proportional to the static air pressure. Luminescence from the embedded probe molecules is excited with the appropriate light source. Due to the quenching effect of oxygen on molecular photoluminescence, the luminescence intensity from the coated surface is an indicator of the local oxygen concentration and thus represents a method to obtain surface pressure. Oxygen diffusion in the PSP layer determines its response to pressure changes on the surface. The response time can be estimated as $\tau \approx \Lambda^2/D$, where $\Lambda$ is the PSP layer thickness and D is the oxygen diffusion coefficient. For a practical PSP layer thickness of 1–2microns, the response time is between 2–4 ms. Such a slow response time represents a significant barrier to utilizing PSPs for the investigation of transient fluid phenomena.

The PSP technique based on oxygen quenching is essentially an absolute pressure gage. The sensitivity, dIr/dP, for most currently available PSP formulations generally vary in the range of 0.0005 to 0.001%/Pa. Unfortunately, this sensitivity can not be increased significantly due to both the physical and photochemical properties of available formulations. Thus, it is very difficult to utilize PSP in applications with small pressure variations such as measurements at low subsonic velocities (Mach number (Ma) below 0.05). Pressure variation on a model is proportional to the square of the Mach number, thus, the pressure variation range, $\Delta P$, for a flow at Ma=0.05 (V=35 mile/h) is approximately 100 Pa which is substantially less than the pressure variation range, $\Delta P$, for a flow at M=0.5 (V=350 mile/h and $\Delta P=10^4$ Pa). Since the PSP sensitivity can not be modified to accurately cover this low scale, reliable results can generally only be obtained by increasing the signal to noise ratio of the acquired intensity (typically by averaging many images) and compensating for all possible error sources such as illumination non-stability, model displacement and deformation, and temperature effects. PSP temperature sensitivity varies between 100 Pa/° C. to 1000 Pa/° C. and is comparable with the total pressure variation range for a flow at Ma=0.05. Thus, PSP measurements at flow velocities below Ma=0.05 require significant efforts on the part of the user to obtain quality data.

Mapping of shear stresses has generally been accomplished in the past by using liquid crystals or oil film measurements. A further method of shear stress mapping involved mounting on a model surface a sensing element in the form of a film made of a flexible polymer gel of a small thickness with a known shear modulus. Markers applied to the film and the model surfaces were used to record the shear deformation of the film under aerodynamic loading. Shearing stress in this case is determined using Hooke's law for shear strain. The markers can be in the form of a grating placed both on the model's surface (under the film) and on the film's surface enabling the use of the Moiré technique for recording shear strain. A drawback of this method is the fact that gradients of the normal pressure can also create a shear displacement of the polymer gel and thus this method works best in the absence of normal pressure gradients. On the other hand, the normal film deformation or displacement is not very sensitive to shear force action. Practical flow investigations are characterized by regions with large pressure spikes and pressure gradients, but usually display shear forces and shear gradients that are 10 to 1000 times smaller. This creates a difficult problem in determining shear deformation from normal and shear surface load components.

SUMMARY OF THE INVENTION

In accordance with one aspect of the invention, a method of measuring a contact force on a surface is provided comprising providing an elastomeric coating material on the surface; subjecting the coating material to a contact force; measuring a first optical measurement value from the coating material corresponding to a normal stress produced by the contact force; measuring a second optical measurement value from the coating material corresponding to a shear stress produced by the contact force; and determining a contact load value for at least one of a plurality of locations on the surface based on the first and second optical measurement values at the at least one location.

In accordance with another aspect of the invention, a method of measuring a contact force on a surface is provided comprising providing an elastomeric coating material on the surface; providing a base luminophore in the coating material; providing a reference luminophore adjacent the surface; subjecting the coating material to a contact force; measuring a first component of a first optical measurement value corresponding to an optical emission from the base luminophore; measuring a second component of the first optical measurement value corresponding to an optical emission from the reference luminophore; and determining a contact load value for at least one location on the surface based on the first and second components of the first optical measurement value, as measured at the at least one location.

In accordance with another aspect of the invention, a method of measuring a contact force on a surface is provided comprising providing an elastomeric coating material on the surface; subjecting the coating material to a contact force; obtaining a thickness measurement value corresponding to a thickness of the coating material resulting from application of the contact force; and determining a load value for at least one of a plurality of locations on the surface based on the thickness measurement value.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Generally, the present invention provides a method for mapping of normal and tangential or shear force distribution on a surface subjected to a load or contact force. In one application of the present invention a method is provided to determine static pressure and shear tension force distribution components on a surface submerged in a moving fluid flow and to allow real-time flow visualization of the forces on the surface. The method and films described herein may be applied to a model surface in wind tunnels, hydro-channels or on "real" vehicles.

It should be noted that descriptions of notations used throughout the following discussion of the invention may be found in Table 1 at the end of the Detail Description of the Invention.

In a particular embodiment of the invention, a pressure sensitive film, such as an elastomeric film or coating, is provided to a surface under study. The pressure sensitive film may be applied to the surface by a variety of techniques including, without limitation, airbrush spraying the coating material onto the surface and gluing a separately prepared pressure sensitive film with adhesive layer, i.e., a so called "shrink fit method". The shrink fit method is capable of providing a film coating to the surface with a controlled thickness and therefore is considered to provide an acceptable film coating for the method of the present invention. Preparation of a film for application to the surface in a shrink fit method includes pouring or otherwise providing the source components of the polymeric layer into a flat cavity having a smoothed or polished bottom. After polymerization of the film, it is peeled out of the cavity and placed on the surface.

Figure 1:
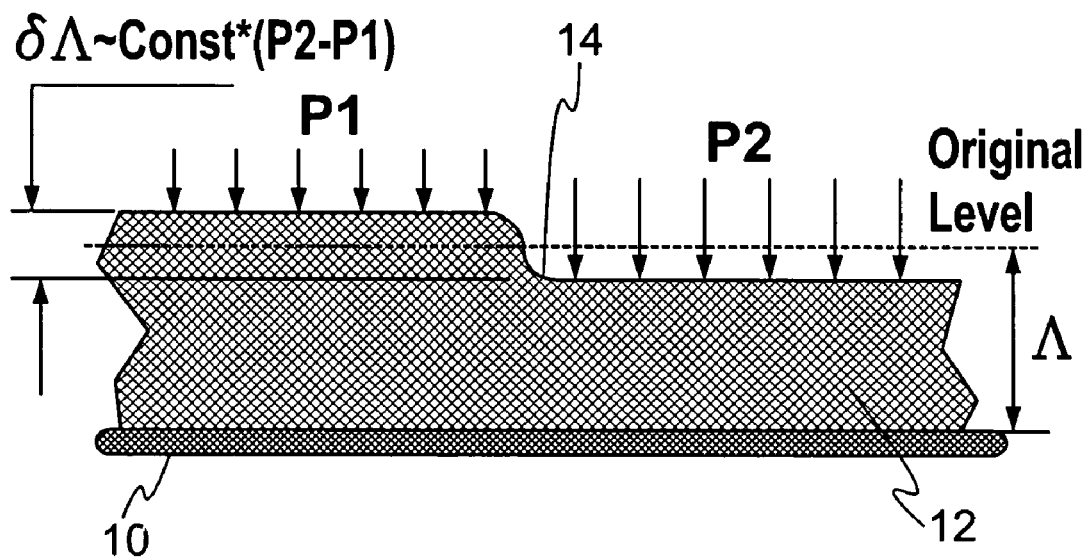
FIG. 1 illustrates a pressure sensitive film subjected to a pressure load.

FIG. 1 illustrates a rigid model surface 10 provided with a coating material comprising an optically transparent polymer film 12. The polymer film 12 has elastomeric properties and in the illustrated embodiment comprises a pressure sensitive film. The polymer film 12 is sufficiently resilient that pressure loads, P1 and P2, applied at adjacent surfaces of the polymer film 12 will displace the film 12, resulting in a change in local layer thickness corresponding to $\delta\Lambda \sim Const*(P1-P2)$, where Const is a coefficient relating the change in thickness to the pressure differential. In general, the information derived from deformations of the polymer film 12 will be governed by pressure gradients rather than by the absolute pressure. It should be noted that the mechanical properties of the polymer film 12 can be adjusted to make the ratio of the shear modulus/elastic modulus very low, resulting in a polymer that behaves as a non-compressible fluid which will recover its original shape after deformation.

In an initial stage of the method, the physical properties of the polymer film 12, are determined for use in determining the forces applied against the surface based on physical responses of the film 12 to the forces, as will be described in greater detail below. In particular, the thickness of the film 12 may be measured using a direct measurement such as a capacitor type thickness gage, or the thickness may be estimated using an optical absorption technique, as described further below.

Additionally, the elastic response of the film 12 to an applied load is measured in a calibration procedure, where calibration of the film 12 in response to known load forces allows determination of unknown load forces by measuring the response of the film 12 to the unknown load forces. The calibration procedure includes application of a predetermined load onto the film surface 14 and measurement of the normal and tangential deformation distributions, to determine the response functions of the film 12. The smaller the load application area, the more the film response function will correspond to an impulse function.

To illustrate determining the response function of the film 12, it is assumed that a one dimensional load will create a deformation which can be treated in two dimensional space. Further, since elastic solids will deform when subjected to a force, a point in the solid originally at (x,y) goes to (X,Y) after deformation. When the displacement vector $\vec{v}=(v_1,v_2)=(X-x, Y-y)$ is small, Hooke's law can be used to relate the stress tensor σ inside the solids to the deformation tensor ε as follows:

$$\sigma_{ij} = \lambda \delta_{ij}\theta + 2\cdot\mu\varepsilon_{ij}, \varepsilon_{ij} = \frac{1}{2}\left(\frac{\partial v_i}{\partial x_j} + \frac{\partial v_j}{\partial x_i}\right), \theta = \varepsilon_{11} + \varepsilon_{22} + \varepsilon_{33} \quad (1)$$

where $\delta_{ij}$ is the Kronecker symbol ($\delta_{ij}=1$, if i=j, $\delta_{ij}=0$, if i≠j), and λ,μ are two Lame constants describing the material mechanical properties in terms of the modulus of elasticity E, and Poisson ratio ν as:

$$\lambda = \frac{E\nu}{(1+\nu)(1-2\nu)}, \mu = \frac{E}{(1+2\nu)}.$$

The equation of elasticity is normally written in a variable form for the displacement vector v(x)∈V as:

$$\int_{\Omega}[\mu\epsilon_{ij}(\vec{v})\epsilon_{ij}(\vec{w})+\lambda\epsilon_{ii}(\vec{v})\epsilon_{jj}(\vec{w})]d\vec{w} = \int_{106}(\vec{g}\cdot\vec{w})d\vec{w} + \int(\vec{h}\cdot\vec{w})d\vec{w}, \forall \vec{w} \in V \quad (2)$$

where $\vec{g}, \vec{h}$ are the volume forces and the boundary stresses, respectively, and the integrals are in volume Ω or on volume boundary Γ. The elastic film is placed in the cavity with the applied boundary condition on the cavity walls as $\vec{v}=0$, volume force is zero, and boundary stress $\vec{h}$ is localized in a small region about 1–2% of the film thickness to be treated as delta-type load.

Figure 2:
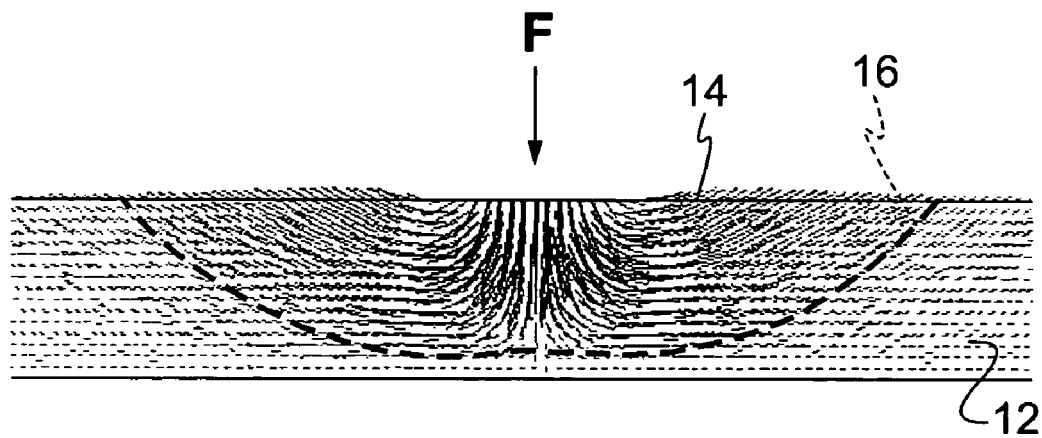
FIG. 2 illustrates a vector displacement map corresponding to a force applied to the pressure sensitive film.

Referring to FIG. 2, solutions of Equation (2) are illustrated in response to a normal surface load, F, applied to a pressure sensitive film. The displacement vector map of FIG. 2 shows that the displacement is concentrated mainly in a region 16 with a diameter which is approximately two to three times the thickness of the elastomeric film layer 12. In addition, it can be seen that the deformation results in displacement vectors extending in both the normal direction and the shear direction, i.e., parallel or tangential to the surface.

Figure 3:
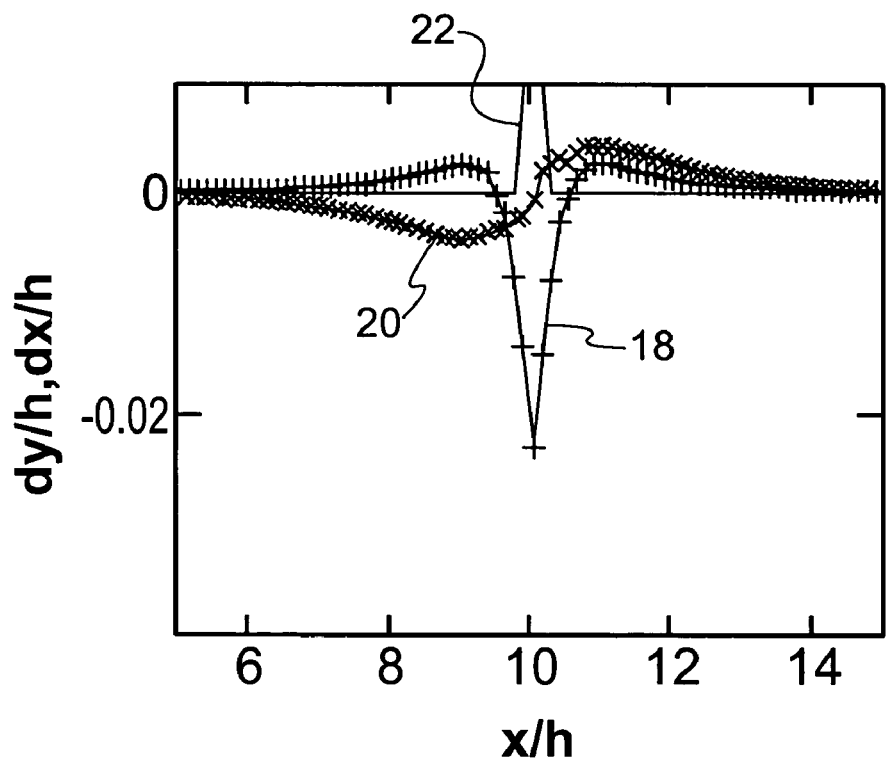
FIG. 3 illustrates normal and tangential displacements that result from shear load applied to the pressure sensitive film.
Figure 4:
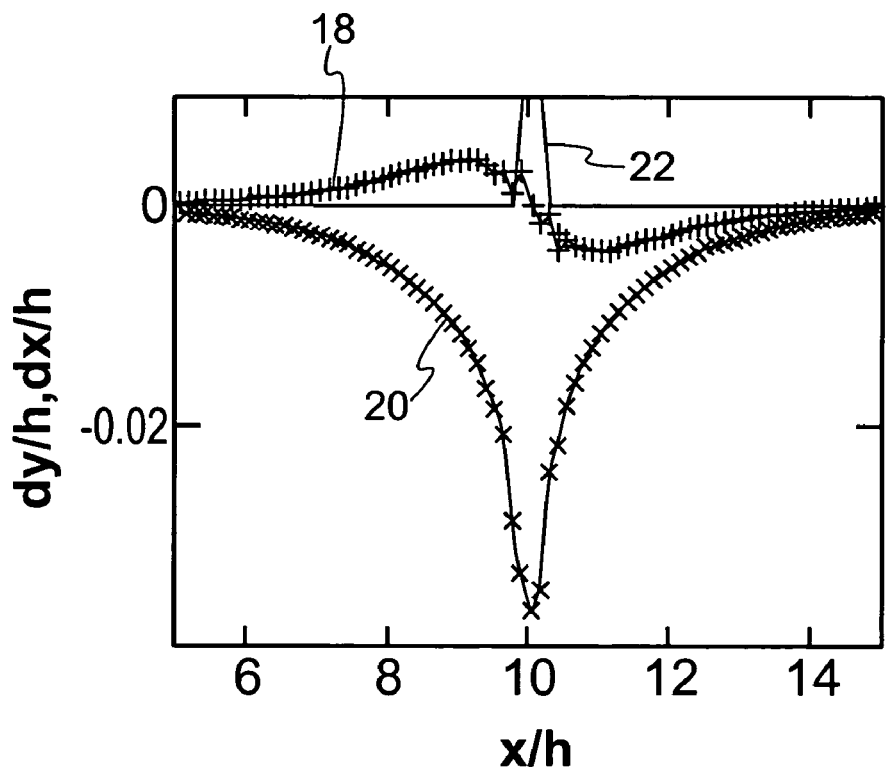
FIG. 4 illustrate normal and tangential displacements that result from normal load applied to the pressure sensitive film.

FIGS. 3 and 4 illustrate the normal and tangential displacements that result from an applied rectangular pulse load, where FIG. 3 illustrates a shear load and FIG. 4 illustrates a normal load applied on the film surface 14. It can be seen that tangential displacements in the area surrounding the applied load are substantially greater than normal displacements in the same area. Line 18 is a plot of the normal displacement of the film layer and line 20 is a plot of the tangential displacement in response to application of the rectangular pulse load, illustrated by line 22. The magnitude of the tangential displacement 20 is approximately two times larger than the magnitude of the normal displacement 18 in the region outside of the applied load 18. Thus, although the normal displacement directly in the region where the load is applied is significantly larger than the tangential displacement in this region, information about the tangential displacement in the region outside the application of the load can be used as an input in determining the applied normal force.

The normal and tangential displacement distributions of the film resulting from the action of localized surface stresses can be treated as the reactions of the film to the pulse loads. The elastic reaction $$R(x) = \begin{bmatrix} R_{normal} \\ R_{tangential} \end{bmatrix}$$

due to the load $$L(x) = \begin{bmatrix} L_{normal} \\ L_{tangential} \end{bmatrix}$$

can be expressed by the linear system:

$$R(x) = \int g(x-x')L(x')dx', \quad (3)$$

where the impulse reaction matrix $$g(x) = \frac{1}{\mu}\begin{bmatrix} n_n & n_t \\ s_n & s_t \end{bmatrix}$$

should be determined by calibration of the film.

An FEA solution for a normal displacement reaction, $\tilde{n}_n$, due to the action of a normal "pulse" force, such as is illustrated in FIG. 4, can be approximated by:

$$\tilde{n}_n(x) = \begin{bmatrix} 1 \\ \exp(-|x|/k1) \\ \exp(-|x|/k2) \end{bmatrix} \cdot [a_0 \ a_1 \ a_2] \quad (4)$$

where the k1, k2 and $a_i$ are approximation parameters.

Similarly, the shear displacement reaction, $\tilde{n}_s$, due to the action of a normal "pulse" force can be approximated by:

$$\tilde{n}_s(x) = \begin{bmatrix} 1 \\ x\exp(-|x|/k3) \end{bmatrix} \cdot [a_3 \ a_4] \quad (5)$$

For the case of a shear "pulse" load, approximations for the normal $\tilde{s}_n$ and shear $\tilde{s}_s$ reactions can be expressed as:

$$\tilde{s}_n(x) = \begin{bmatrix} 1 \\ x\exp(-|x|/t1) \end{bmatrix} \cdot [b_1 \ b_2] \text{ and} \quad (6)$$

-continued $$\tilde{s}_s(x) = \begin{bmatrix} 1 \\ \exp(-|x|/t2) \\ \exp(-|x|/t2) \end{bmatrix} \cdot [b_3 \quad b_4 \quad b_5] \quad (7)$$

Thus, combining Equations (3) through (7), the normal and shear components of a reaction due to a discrete load $L_j$, applied at the interval $[x_0, x_N]$ can be expressed as:

$$R_{nj} = \sum_{k=0}^{N} L_{nk}\tilde{n}_n(x_j - x_k) + L_{gk}\tilde{s}_n(x_j - x_k) \text{ and} \quad (8)$$

$$R_{sj} = \sum_{k=0}^{N} L_{nk}\tilde{n}_s(x_j - x_k) + L_{gk}\tilde{s}_s(x_j - x_k) \quad (9)$$

The system of linear equations given by Equations (8) and (9), with unknown load, $L_k$, has the diagonally dominant matrix expressed as follows:

$$G_{jk} = \frac{1}{\mu}\begin{pmatrix} \tilde{n}_{njk} & \tilde{s}_{njk} \\ \tilde{n}_{sjk} & \tilde{s}_{sjk} \end{pmatrix} \quad (10)$$

and which can be inverted to yield the solution of the linear Equations (8) and (9), expressed generally as follows:

$$L = G^{-1} \cdot R \quad (11)$$

As can be seen from the above, by inputting into Equation (11) normal and shear displacements of a film 12 resulting from an applied contact force or load, the load distribution corresponding to the applied load may be reconstructed. In particular, the load distribution, L, may be determined by measuring a change in the thickness of the elastomeric film 12, and by measuring a lateral displacement substantially perpendicular to the direction of a normal force, i.e., generally parallel or tangential to the film surface 14, and inputting the measured displacements into the response function expressed by Equation (11).

Figure 5:
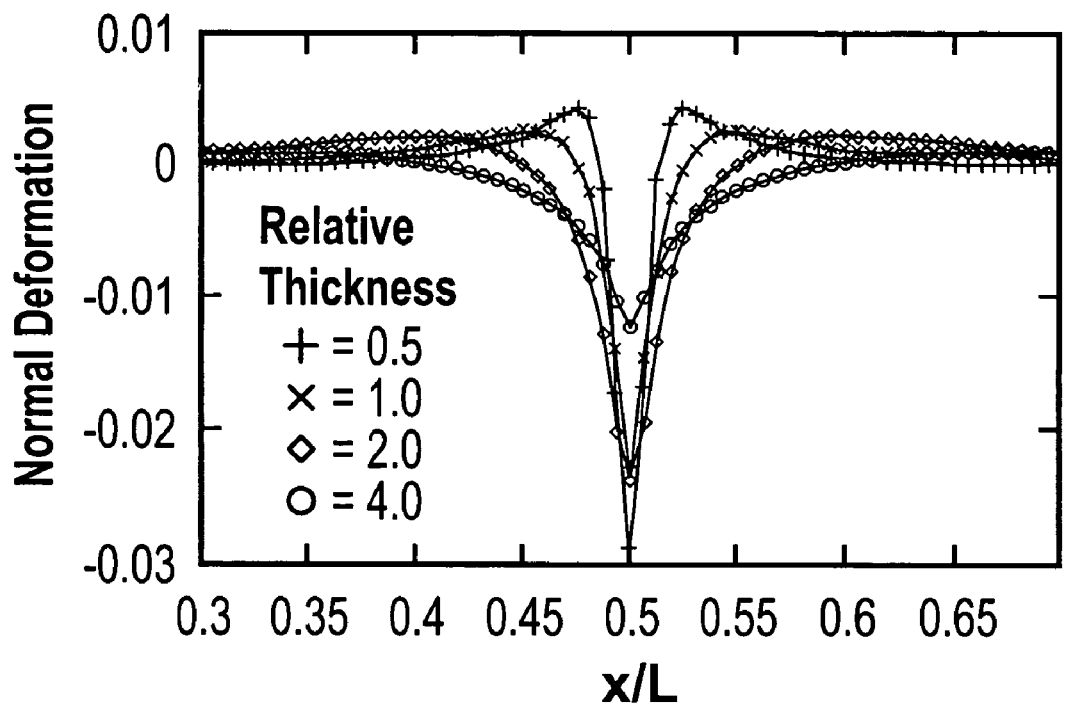
FIG. 5 illustrates the results of a finite element analysis modeling of the film's normal response to a normal rectangular load for different relative film thicknesses.
Figure 6:
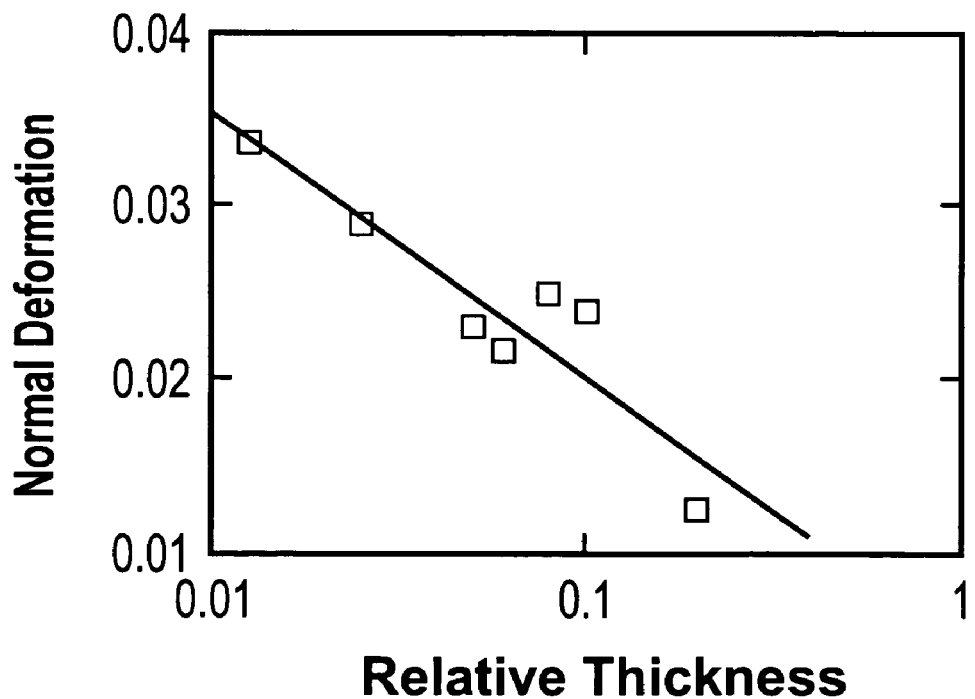
FIG. 6 illustrates the maximum normal deformation of the film under a constant load, plotted as a function of relative film thickness.
Figure 7:
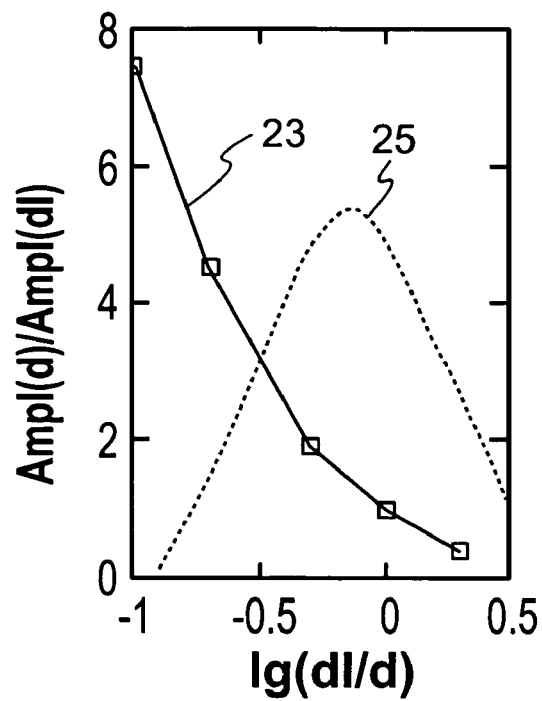
FIG. 7 illustrates a relationship between shear sensitivity and relative film thickness.

It should be noted that the response of the film 12 to a load will be a function of the film thickness. FIG. 5 presents the results of an FEA modeling of the film's normal deformation response function due to a predetermined rectangular load as a function of relative film thickness where film relative thicknesses of 0.5, 1.0, 2.0 and 4.0 are provided for comparative illustration. In addition, the maximum normal deformation of a film under a constant load will be a function of the thickness of the film, as illustrated in FIG. 6. The results depicted in FIGS. 5 and 6 illustrate that the film thickness should be taken into account in gage calibration. In addition, FIG. 7 illustrates the relationship of shear response, or film sensitivity, as a function of relative film thickness, where line 23 depicts a maximum of shear deformations and line 25 depicts a maximum of normal deformations. Thus, an impulse response function g(x) or its discrete presentation G, is determined mainly by local film thickness and shear modulus $\mu$. Of course, for a finite film layer applied on a curved surface, g(x) will be function of the local curvature and nearby film edges will be determined by boundary conditions as well.

The present method provides an approach to measuring film thickness comprising an optical technique which provides for determination of thickness variations under dynamically varying load conditions, such as may occur during fluid flow over a surface. An optical measurement technique is preferable for the method described herein in that it is non-contact (requiring no connections to the measurement surface), it allows large areas to be covered, and allows for high spaial resolution. The thickness of the film is measured optically by observing the photoluminescence (fluorescence intensity) from a base luminophore distributed in the film. Taking into account the absorption of the excitation light, the luminescent output from a film layer with a thickness $\Lambda$ (FIG. 8) can be expressed by Beers law:

$$I_1(\Lambda) = I_o \Phi_1[1 - \exp(-\epsilon_1 \Lambda)] \quad (12)$$

where $\Phi_1$ is the quantum efficiency of the base luminophore, $\epsilon_1$ is the absorption coefficient of the base luminophore, and $I_o$ is the intensity of the excitation light.

For optically thin films, $\epsilon\Lambda \ll 1$, and expression (12) can be linearly approximated by:

$$I_1(\Lambda) \sim I_o \Phi_1 \epsilon_1 \Lambda \quad (13)$$

Thus, by taking the ratio between an optical measurement value of luminescent intensity obtained for the no-load or unload condition, $I_{1u1} \sim I_{1o}\Phi_1\epsilon_1 L_{u1}$, and the load condition, $I_{11} \sim I_{1o}\Phi\epsilon_1(L_{n1} + \delta L)$, an estimate of the film deformation $\delta L/L$ can be determined as follows:

$$w = \delta L/L = I_{11}I_o'/I_{1u1}I_o - 1 \quad (14)$$

where $I_o'$ describes the illumination level for the no-load condition and it is assumed that $I_o = I_o'$, i.e., a stable illumination level exists for both the load and no-load conditions. Generally, the pressure distribution on the surface generates both surface displacement and deformations relative to the excitation light source, such that, even in the case of a very stable excitation light source, $I_o \neq I_o'$. In order to compensate for non-uniform illumination, a second or reference luminophore is provided located adjacent the surface 10 below the polymeric film 12.

Figure 8:
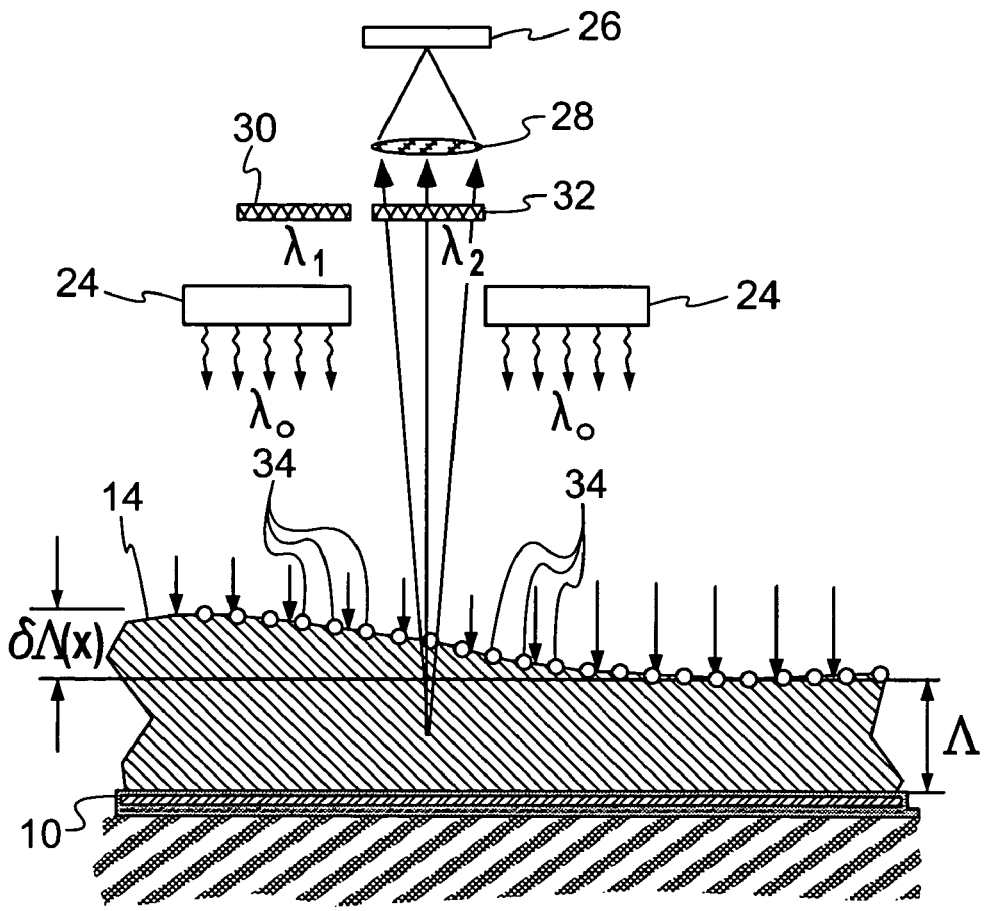
FIG. 8 illustrates an optical system for obtaining normal and shear optical measurement values from the pressure sensitive film subjected to a pressure load.

Referring to FIG. 8, a model surface 10 is illustrated coated with an elastomer polymer film 12 having a thickness $\Lambda$, and including a base luminophore dispersed through the film 12 which produces a luminescence at an emission wavelength $\lambda_a$ and an intensity $I_a$ when it is illuminated by a light source 24, such as an LED lamp, emitting light having a wavelength $\lambda_o$. A reference luminophore is provided adjacent the surface 10, beneath the polymer film 12, and emits light having a wavelength $\lambda_b$ and an intensity $I_b$ when it is illuminated by the light source 24. An optical sensor 26 is also provided for receiving optical measurement values comprising the emissions from the base and reference luminophores. The optical sensor 26 preferably comprises a single photodetector for receiving the emissions from both luminophores, and including an objective lens 28 and switchable filters 30, 32 corresponding to the outputs of the respective luminophores. For example, a multiple element photodetector such as a CCD camera may be provided, or a single element photodetector may be provided such as a photodiode or photomultiplier. Alternatively, two separate photodetectors may be provided with filters centered on the corresponding luminescence outputs from the base and reference luminophores.

It should be understood that the intensity $I_a$ of the luminescence emitted from the base luminophore is a function of the local film thickness and the local illumination level, while the intensity $I_b$ of the luminescence emitted from the reference luminophore is a function of only the local illumination level. In addition, it should be noted that the luminescent spectra of the reference luminophore is different than that of the base luminophore, and that at least a portion of the luminescent spectra of the reference luminophore lies in the absorption spectra of the base luminophore.

Accordingly, since a portion of the luminescence output from the reference luminophore is reabsorbed by the base luminophore, then the luminescent signal from the reference luminophore can be expressed as:

$$I_2(\Lambda) \sim I_o(\Phi_2 - \epsilon_{12}\Lambda) \qquad (15)$$

where $\Phi_2$ is the quantum efficiency of the reference luminophore and $\epsilon_{12}$ is the reabsorption coefficient associated with the reabsorption by the base luminophore.

The thickness of the film at a given location can be normalized to the reference luminescence. The ratio of the reference and base luminescence, $\kappa = I_2(\Lambda)/I_1(\Lambda)$, as measured at a given location, provides an estimate of the film thickness for the given location as expressed by:

$$\Lambda_e = \Phi_2/(\epsilon_{12} + \kappa\epsilon_1) \qquad (16)$$

The normalized thickness estimate of Equation (16) can be used for calibration of the elastic layer in combination with an estimate of the response function for the elastic layer. Normalizing the detected luminescence to the reference luminescence also provides a means to compensate for non-uniform excitation, such as may occur from power variations to the light, variations in the angle of incidence on the surface and other variables which may affect the amount of light provided to the luminophores.

In accordance with the above description, it should be understood that the ratio of $(I_{a1}I_{b0}/I_{a0}I_{b1})$ may be used to determine the normal deformation of the film, where $I_{a0}$ and $I_{b0}$ describe the intensity of the luminescence emitted from the base and the reference luminophores, respectively, under a no-load condition, and $I_{a1}$ and $I_{b1}$ describe the intensity of the luminescence emitted from the base and the reference luminophores, respectively, when a load is applied to the film.

Shear displacements of the elastic film 12 may be measured by detecting a physical movement of the elastic film 12 in the direction of the shear force. Shear displacements can be measured by applying markers 34 (FIG. 8) to the surface 14 of the pressure sensitive film 12 and recording the marker displacements under the action of aerodynamic loading. For example, the markers 34 may be in the form of a grid formed on the surface of the film. Alternatively, the surface 14 of the film 12 may be provided with markers 34 comprising a coating such as a fine phosphor powder, or microspheres, such as $TiO_2$ microspheres, may be provided having a diameter of less than 1 micrometer which form clusters on the film surface 14 and which create a contrast pattern detectable by a CCD camera. As with the film thickness measurement, two images are required for measurement of shear displacement, the first at the no-load condition, and the second at the aerodynamically loaded condition. Because the markers 34 are small and do not cover a substantial portion of the surface of the elastic film, a single optical sensor 26 may be used to receive optical measurement values for determining both the shear displacement and the film thickness. A marker pattern may also be applied directly to the supporting surface 10 underlying the film 12 for providing image registration information and to compensate for movement and deformation of the supporting surface 10 under aerodynamic or inertia forces.

The two dimensional shear displacement field is determined by applying a cross-correlation analysis to particular marker locations, comparing the position of the marker 34, or markers, at each location before and after application of a load. The cross-correlation function is calculated in a small two dimensional interrogation window which is sequentially stepped over the entire image pair comprising the image of marker positions during a no-load condition and the image of marker positions during a load condition. The window dimensions are determined by the marker density and the minimum scale of the shear field. To exclude the possibility of over-sampling, the step size for scanning the interrogation window over the image pair is one-half the window size.

Figure 9:
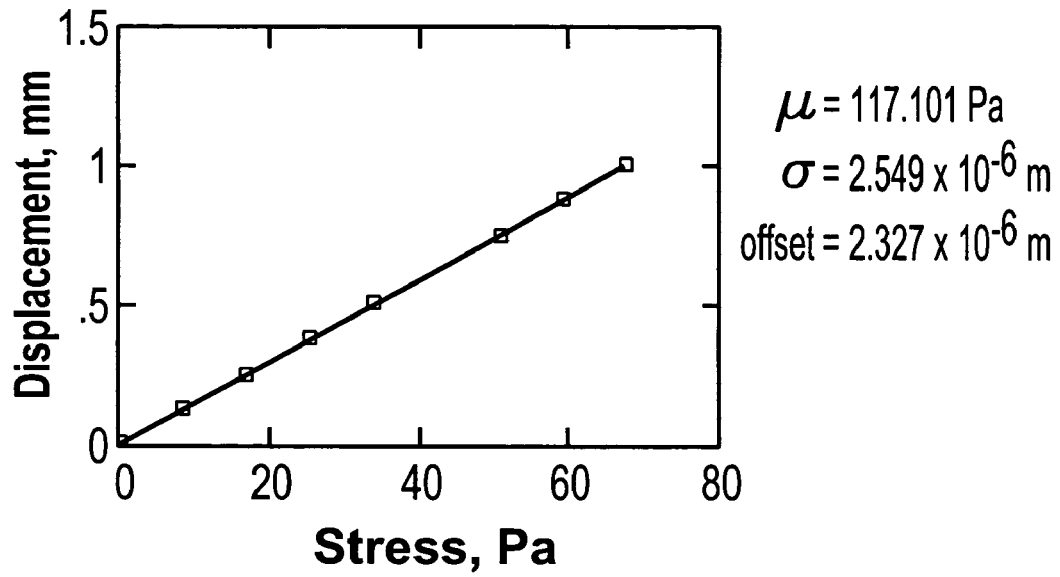
FIGS. 9 and 10 illustrate calibration plots for film compositions with shear stress modulus of 117 Pa and 1279 Pa, respectively.
Figure 10:
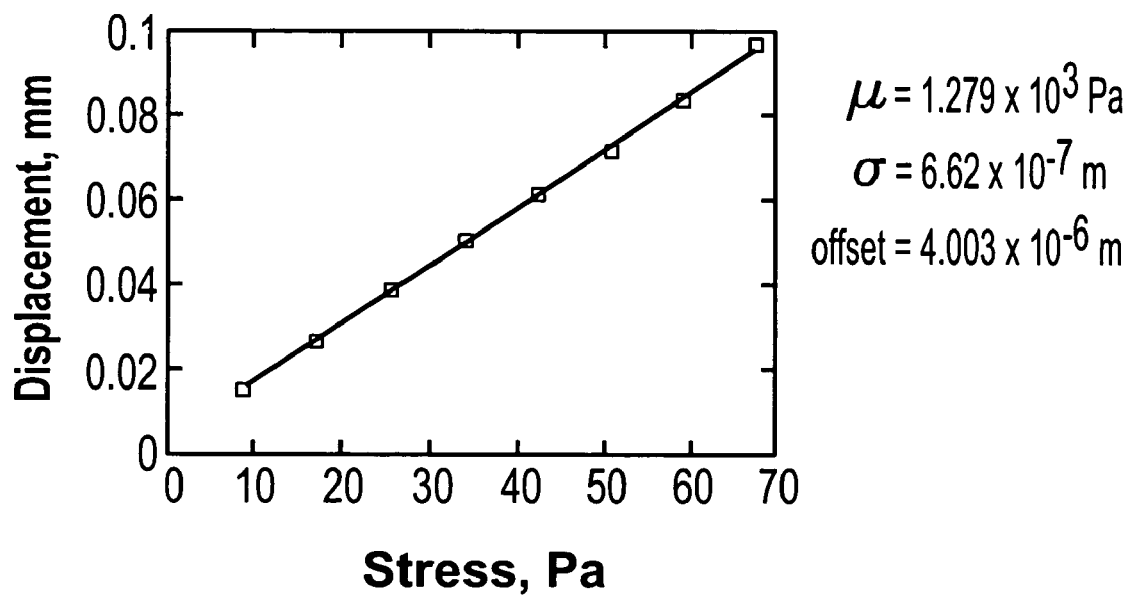

The shear stress modulus $\mu$ is the main parameter that determines the sensitivity of the pressure sensitive film. This parameter can be measured directly in a calibration step of the elastic film 12 by applying a shear force to the film 12 and measuring the corresponding displacement. A pressure sensitive film (PSF) is a rarefied three dimensional polymer network structure in which the free volume is filled by a low-molecular fluid, i.e., an elastomer. The amount of polymer in the film is significantly smaller than the low-molecular weight liquid component. The shear stress modulus is determined by the number of cross-links in the polymer network and by the ratio of polymerized to liquid components. The number of cross-links is a function of numerous parameters including: the relative amount of catalyst reagent, catalyst age, temperature and humidity during polymerization, area of the free surface in contact with the ambient atmosphere, and the wall material of the polymerizing volume. By fine tuning these parameters it is possible to create a stable PSF which has a shear stress modulus in the range of $\mu=100$ to 2000 Pa, where a higher value for $\mu$ results in a more stable film composition. FIGS. 9 and 10 display PSF calibration curves for two extreme cases of shear modulus.

Figure 11:
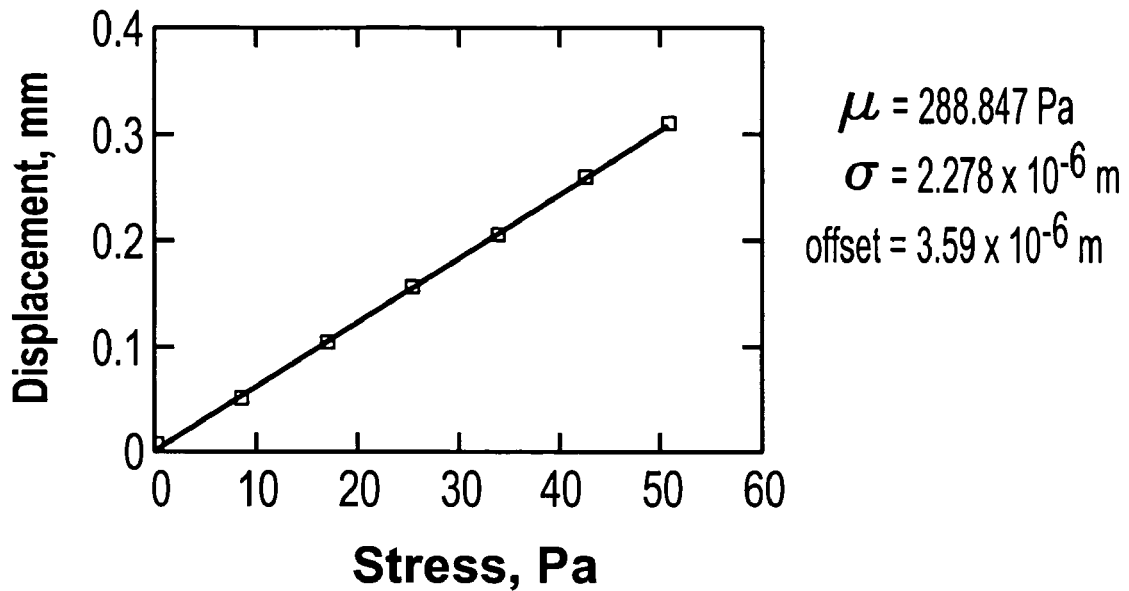
FIGS. 11 and 12 illustrate calibration plots for film compositions with shear stress modulus of 288 Pa and 376 Pa, respectively.
Figure 12:
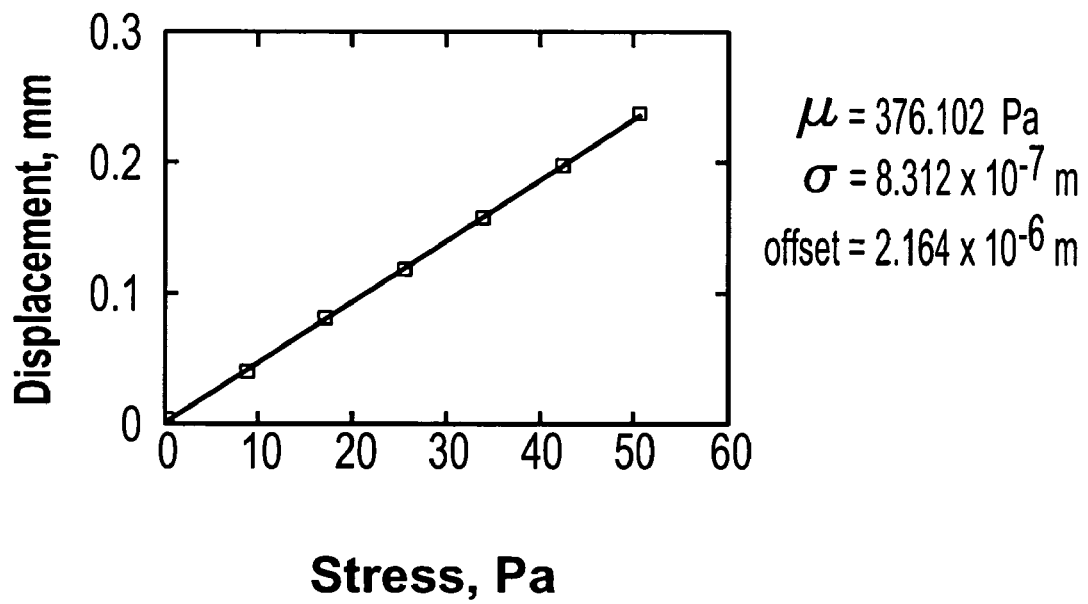

It is very difficult to achieve a stable film with a shear stress modulus, $\mu$ below 100 Pa. This is mainly due to the effects of aging on the mechanical properties of the film. The most significant aging effect on these films is the leakage of the liquid component out of the polymer matrix resulting in a gradual increase in the value of the shear modulus. The PSF can lose up to 50% of its liquid component over time. Films with a shear stress modulus in the range of 200 to 400 Pa and a thickness between 0.25 and 1.5 mm are stable and sensitive to applied loads. FIGS. 11 and 12 display a calibration obtained on such a composition, having a film thickness of approximately 1730 µm, where the shear stress modulus of the material in FIG. 11 is approximately 288 Pa and the shear stress modulus of the material in FIG. 12 is approximately 376 Pa. These compositions are characterized by good linearity and small hysteresis. The hysteresis or ability of the film to recover from a load, is comparable to the tangential displacement measurement accuracy ($\sigma_t=1$ to 3 µm). The total dynamic range of displacement for these films is between 200 and 400 µm which is large compared to the film thickness of 1730 µm.

The method described herein, using pressure sensitive film, is sensitive to both normal and tangential (shear) forces applied to the film surface as well as to inertial forces applied to its volume. By modifying the elastic properties and layer thickness, it is possible to adjust the sensitivity of the film to the surface force components which allows for an accurate measurement of the tangential and normal film deformations. It follows that the more accurate that the deformation data is, the more accurate will be the reconstruction of the load forces, as obtained from Equation (11) above.

EXAMPLES

Figure 13:
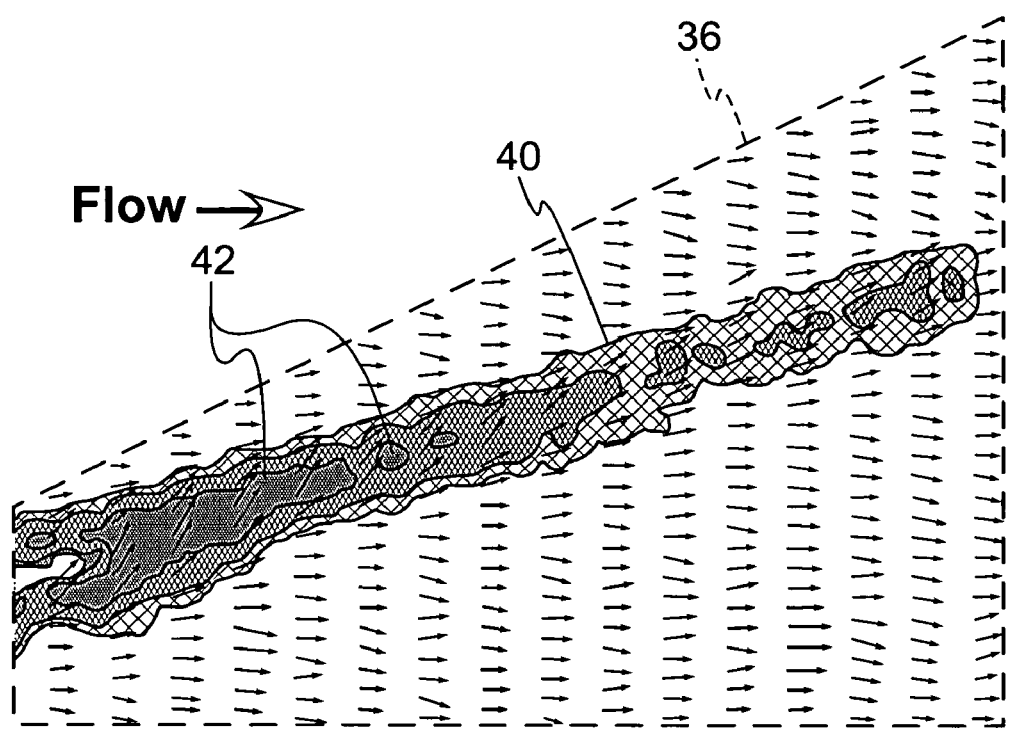
FIG. 13 illustrates a shear displacement vector field, including a region depicting a vertical component of the shear vector on a delta wing model subjected to an aerodynamic load.

Referring to FIG. 13, a delta wing model, defined by phantom line 36, was used to test the PSF technique at a flow velocity of 15 m/s and an angle of attack of 10°. The model surface was covered with a polymer layer having a thickness of 1 mm, where the film is positioned within a cavity of a depth substantially equal to the thickness of the film to position the upper surface of the film generally coplanar with the surrounding surface of the wing. A fine phosphor powder was applied on top of the PSF to create a pattern that could be used for shear deformation measurements.

FIG. 13 illustrates the result of a cross correlation analysis of the shear displacement field. It can be seen that the aerodynamic load produces a vortex region creating a narrow decompression region, generally depicted by 40, above the wing. The decompression region 40 produces a vertical component of the shear vector. The region 42 depicts a substantially greater vertical component of shear vector within the vortex region 40. The narrow decompression region 40 defines a pressure gradient oriented mainly across the ambient flow direction, so for each cross section across the ambient flow, the elastic deformation can be treated as a plane.

Figure 14:
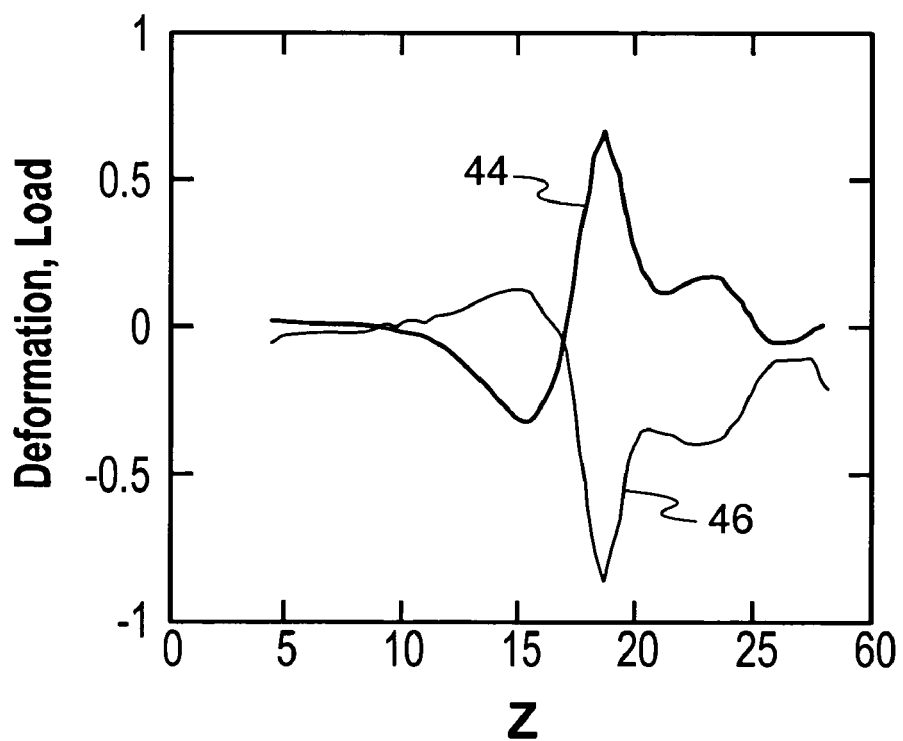
FIG. 14 illustrates a relative displacement and a reconstructed pressure distribution for a cross-section of the delta wing model of FIG. 12.

Referring to FIG. 14, the measured load produced by the aerodynamic flow at a cross-section of the delta wing of FIG. 13 is depicted by line 44. In addition, and a reconstruction of the pressure field is depicted by line 46, which was obtained by providing the film deformation measurements as input to the response function described by Equation (11).

Figure 15:
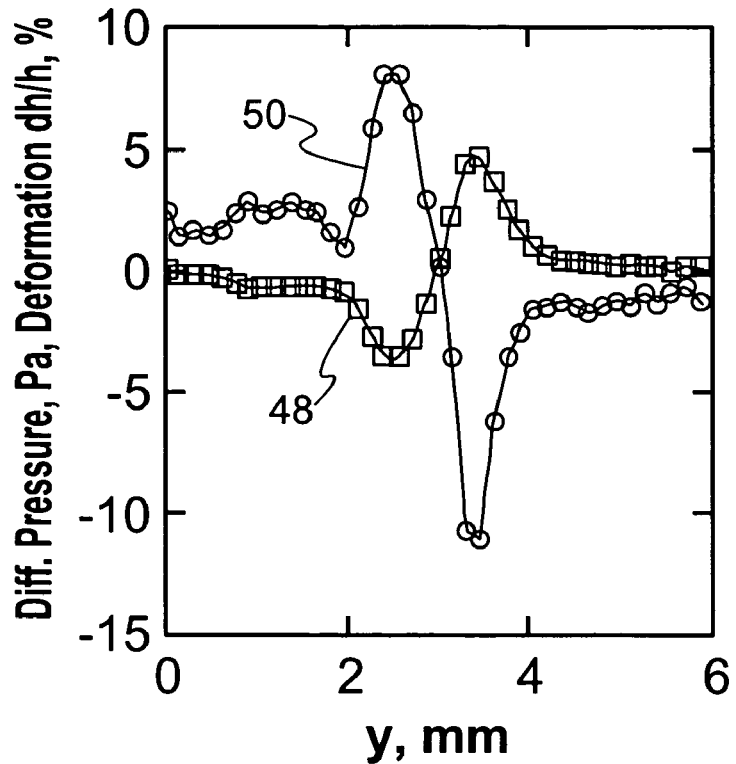
FIGS. 15 and 16 illustrate the normal and shear response function outputs for an air flow directed over a vortex generator to form a vortex passing over the film.
Figure 16:
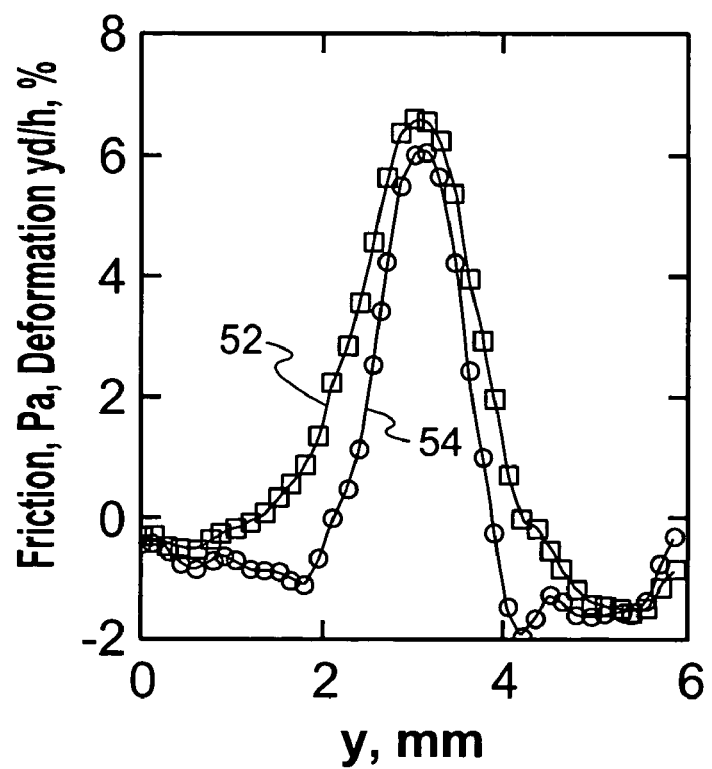

FIGS. 15 and 16 illustrate the response function outputs for an additional test example in which an air flow was directed over a vortex generator (not shown) to form a vortex passing over the film 12. In FIG. 15, line 48 depicts a measured normal deformation for a cross-section of the film, and line 50 depicts a reconstructed normal pressure field. In FIG. 16, line 52 depicts a measured friction or shear deformation for the cross-section of the film, and line 54 depicts a reconstructed stress field.

Figure 17:
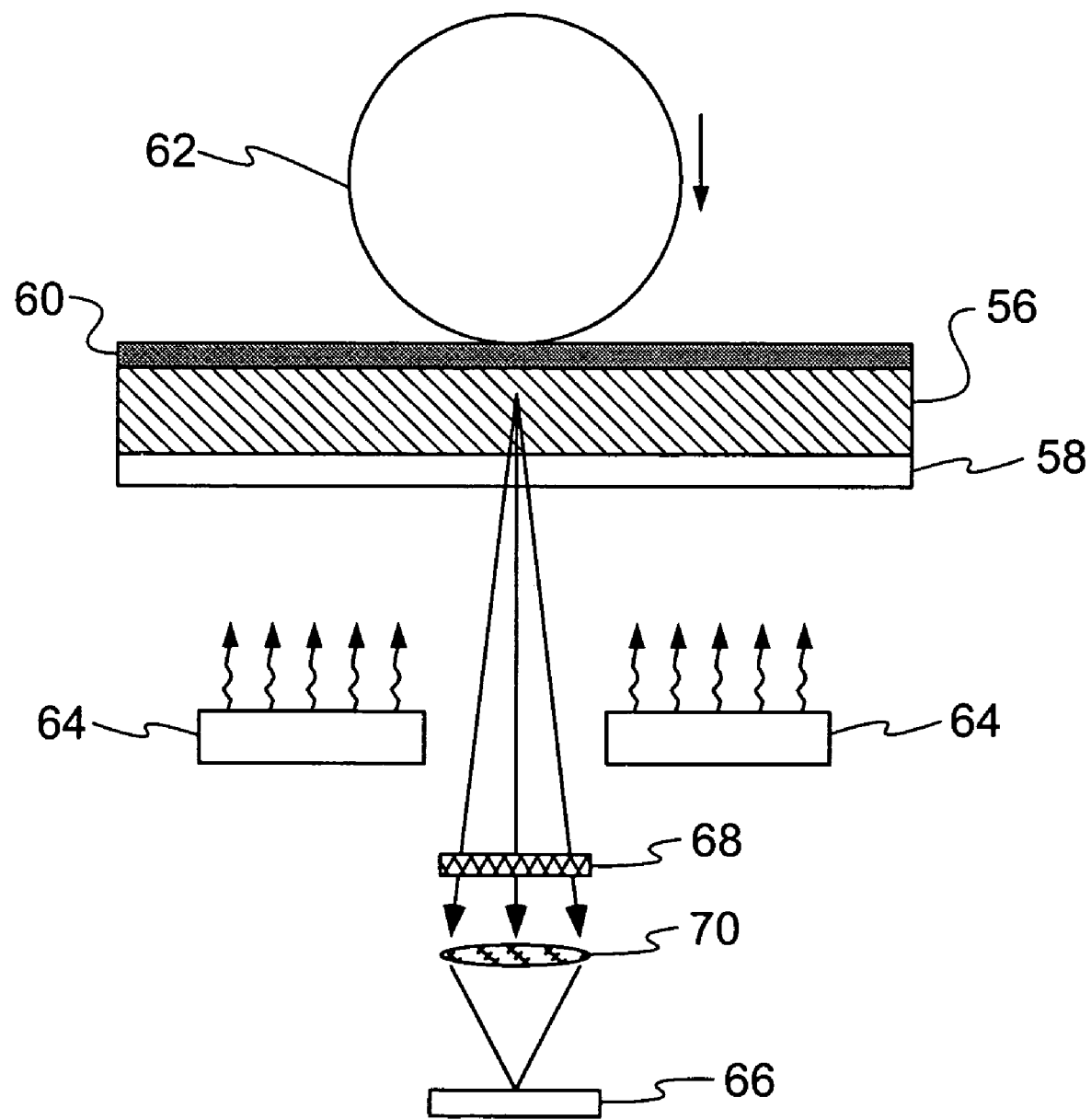
FIG. 17 illustrates an alternative application of the invention for determining contact forces from an object engaging the pressure sensitive film.

Referring to FIG. 17, an alternative application of the method of the present invention is illustrated in which a polymer film 56 is applied to a transparent support surface 58. The polymer film 56 is covered by an optically opaque layer 60 which is engaged by an object 62 applying a contact force to the polymer film 56. Luminophores in the film 56 provide an indication of a change in thickness, as in the previously described embodiment, in response to illumination by a light source 64 and reception of emitted light to an optical detector 66 through a filter 68, and an objective lens 70. The opaque layer 60 prevents the contact with the object 62 with the polymer film 56 from producing optical effects, such as reflection or transmission of light, which may adversely affect the accurate measurement of the luminophore emission.

Figure 18:
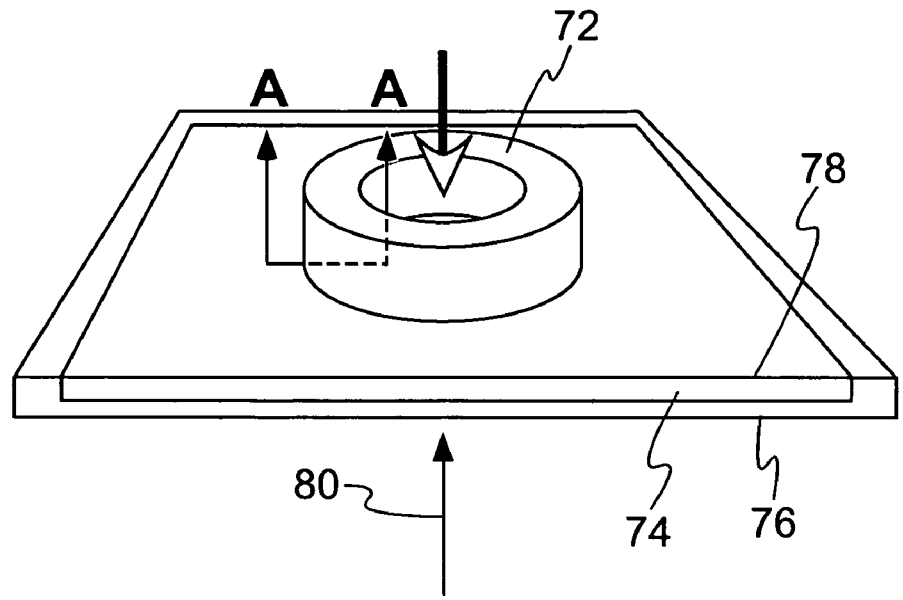
FIG. 18 illustrates a further example of the application of FIG. 17, in which a toroidal contact force is engaged on the pressure sensitive film.
Figure 19:
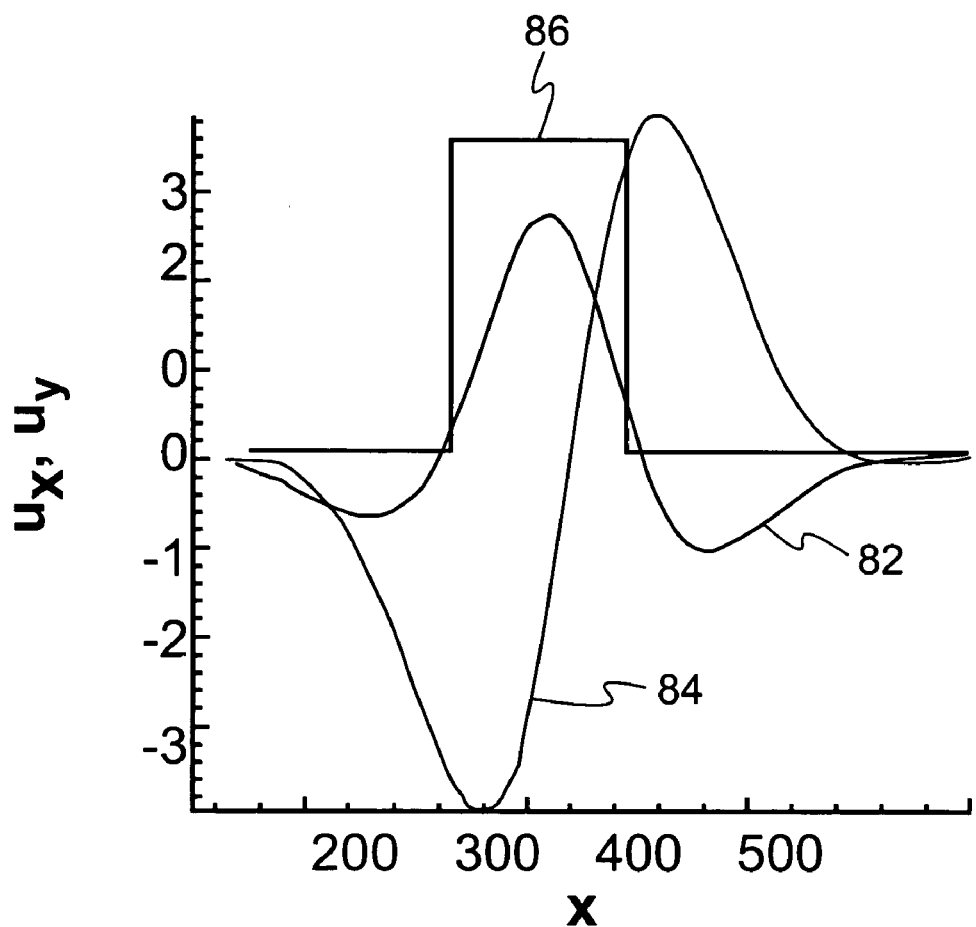
FIG. 19 illustrates the normal and shear deformation responses at section A—A in FIG. 18.

Referring to FIGS. 18–19, a further example similar to the example of FIG. 17 is illustrated. As seen in FIG. 18, a toroidal object 72 is positioned on a polymer film 74 located on a support surface 76. An optically opaque layer 78 is engaged by the object 72 and contact force is transferred to the polymer film 74. The support surface 76 is optically transparent such that luminophores in the polymer film 74 may receive and transmit light in the direction 80 through the support surface 76. FIG. 19 illustrates the normal deformation component, line 82, and shear deformation component, line 84, with line 86 depicting the contact force applied by the object 72 at section A—A in FIG. 19.

The method described herein provides a frequency response conducive to "real time" data collection in that the frequency response of the measurement system is determined by the natural frequency of the surface stress sensitive film, which can be estimated by the equation:

$$f_0 = \frac{1}{2\pi}\sqrt{\frac{\mu}{\rho\Lambda^2}} \quad (17)$$

where $\rho$ is the film polymer density, $\Lambda$ is the film thickness, and $\mu$ is the shear modulus.

Substituting $\mu\epsilon(100 \ldots 3000)$Pa, and $b\epsilon(0.05 \ldots 1)$mm into Equation (17) yields a frequency response in the range of 0.2 to 30 KHz.

In addition, since the present method obtains measurement values based on a relative change in the position of the polymer film, it is possible to increase the sensitivity of a test performed by the method by altering the material properties to have an increased sensitivity to the particular range of measurements, as may be seen with reference to FIG. 7. In particular, the shear stress modulus of the material and the material thickness may be selected to accommodate the particular conditions imposed by the load. In general, it is desirable to select the polymer film properties such that the ratio of the shear stress modulus to the elastic modulus is very low.

TABLE 1

Notations

| Symbol | Description |
| --- | --- |
| Ω | 3D (2D) volume of elastic material |
| Γ | Boundary of Ω |
| u, v, w | Displacements |
| ε | Strain |
| σ | Stress |
| λ, μ | Lame constants |
| E | Modulus of elasticity |
| ν | Poisson ratio |
| Λ | Film thickness |
| g, G | Impulse response matrix |
| n, s | Normal and tangential components of impulse matrix |
| L | Vector of surface stresses |
| R | Vector of surface deformations |
| ρ | Polymer density |
| f$_o$ | Elastic layer natural frequency (first shift deformation tone) |
| a, b, k, t | Approximation coefficients |
| Φ | Luminophore quantum efficiency |
| η | Absorption coefficient |
| I | Light intensity |
| λ | Wavelength |

While the methods herein described constitute preferred embodiments of this invention, it is to be understood that the invention is not limited to these precise methods, and that changes may be made therein without departing from the scope of the invention which is defined in the appended claims.

What is claimed is:

1. A method of measuring a contact force on a surface comprising:

providing an elastomeric coating material on the surface;

subjecting a side of the coating material opposite from the surface to a contact force;

measuring a first optical measurement value from the coating material corresponding to a normal stress based on a change in thickness of the coating material resulting from the contact force;

measuring a second optical measurement value from the coating material corresponding to a shear stress produced by the contact force; and determining a contact load value for at least one of a plurality of locations on the surface based on both the first and second optical measurement values at the at least one location.

2. The method of claim 1 wherein the load value determined for the at least one location is expressed in terms of a differential measurement.

3. The method of claim 1 including providing an optical sensor, and positioning the optical sensor for receiving the first and second optical measurement values substantially simultaneously.

4. The method of claim 1 including a calibration step for determining a relative thickness of the coating material at each of the plurality of locations on the surface.

5. The method of claim 1 wherein the first optical measurement value comprises the magnitude of a luminescent output from the coating material and the second optical measurement value comprises a displacement of the coating material in a direction transverse to the thickness of the coating material.

6. The method of claim 1 including a base luminophore located in the coating material and a reference luminophore located adjacent the surface opposite the side subjected to the contact force, where the step of measuring the first optical measurement value comprises measuring optical emissions from the base and reference luminophores at the time the contact force is applied.

7. The method of claim 6 wherein the reference luminophore has a different luminescent spectra than that of the base luminophore, and at least a portion of the luminescent spectra of the reference luminophore lies in the absorption spectra of the base luminophore.

8. The method of claim 1 wherein the contact force is produced by a fluid flow over the surface.

9. The method of claim 1 wherein the surface is optically transparent and including providing an optically opaque layer on the side of the coating material opposite from the surface, and where the step of subjecting the coating material to a contact force comprises applying the contact force to the opaque layer and receiving the first and second optical measurement values through the optically transparent surface.

10. The method of claim 1 wherein the step of determining the load value comprises inputting a value corresponding to a normal stress, as determined from the first optical measurement value, and a value corresponding to a shear stress, as determined from the second optical measurement value, into a response function coupling the normal and shear stress values.

11. The method of claim 1 including the steps of estimating the thickness of the coating material at the at least one location, estimating an elastic response function at the at least one location, and producing a response function for the entire coating material using the estimated thickness and estimated response function.

12. The method of claim 1 wherein the coating material comprises a force sensitive film, and including the step of selecting a shear stress modulus and thickness of the pressure sensitive film with reference to a shear sensitivity.

13. The method of claim 1 wherein the coating material comprises a pressure sensitive elastomeric material.

14. A method of measuring a contact force on a surface comprising:

providing an elastomeric coating material on the surface;

providing a base luminophore in the coating material;

providing a reference luminophore adjacent the surface;

subjecting a side of the coating material opposite from the surface to a contact force;

measuring a first component of a first optical measurement value corresponding to an optical emission from the base luminophore based on a change in thickness of the coating material resulting from the contact force;

measuring a second component of the first optical measurement value corresponding to an optical emission from the reference luminophore; and determining a contact load value for at least one location on the surface based on the first and second components of the first optical measurement value, as measured at the at least one location.

15. The method of claim 14 wherein the reference luminophore has a different luminescent spectra than that of the base luminophore, and at least a portion of the luminescent spectra of the reference luminophore lies in the absorption spectra of the base luminophore.

16. The method of claim 14 including performing a calibration step comprising determining a ratio relating the luminescence of the reference luminophore to the luminescence of the base luminophore.

17. The method of claim 14 including the step of measuring a second optical measurement value corresponding to a displacement of the coating material in a direction transverse to the thickness of the coating material.

18. The method of claim 17 where the step of determining the load value comprises inputting a value corresponding to a normal stress, as determined from the first optical measurement value, and a value corresponding to a shear stress, as determined from the second optical measurement value, into a response function coupling the normal and shear stresses.

19. The method of claim 14 wherein the measured first and second components of the first optical measurement value comprise a function of an instantaneous thickness of the coating material to provide a measure of the contact force.

20. A method of measuring a contact force on a surface comprising:

providing an elastomeric coating material on the surface;

providing a base luminophore in the coating material;

providing a reference luminophore adjacent the surface;

subjecting the coating material to a contact force;

measuring a first component of a first optical measurement value corresponding to an optical emission from the base luminophore;

measuring a second component of the first optical measurement value corresponding to an optical emission from the reference luminophore;

determining a contact load value for at least one location on the surface based on the first and second components of the first optical measurement value, as measured at the at least one location; and wherein the base luminophore emits a luminescence at an emission wavelength $\lambda_a$ and an intensity $I_a$ and reference luminophore emits luminescence at a different emission wavelength $\lambda_b$ and an intensity $I_b$, and where the step of determining a load value includes detecting luminescent outputs $I_{a0}$ and $I_{b0}$ from the base and reference luminophores, respectively, at a first load condition, detecting luminescent outputs $I_{a1}$ and $I_{b1}$ from the base and reference luminophores, respectively, at a second load condition, and determining a normal deformation of the coating material at the at least one location using the ratio $(I_{a1}I_{b0}/I_{a0}I_{b1})$.

21. The method of claim 20 wherein at least a portion of the luminescent spectra of the reference luminophore lies in the absorption spectra of the base luminophore.

22. The method of claim 20 wherein the first load condition comprises applying a known normal contact force to the surface for calibrating the load measurement, and the second load condition comprises applying an unknown contact force to the surface.

23. The method of claim 22 wherein the unknown contact force comprises application of a fluid flow over the surface to apply the second load condition.

24. A method of measuring a contact force on a surface comprising:
   providing an elastomeric coating material on the surface;
   subjecting a side of the coating material opposite from the surface to a contact force;
   obtaining a thickness measurement value corresponding to a change in thickness of the coating material resulting from application of the contact force at the time the contact force is applied; and
   determining a load value for at least one of a plurality of locations on the surface based on the thickness measurement value.

25. The method of claim 24 where the step of determining the load value comprises inputting a value corresponding to a normal stress, as determined from the thickness measurement value, and a value corresponding to a shear stress into a response function coupling the normal and shear stresses.

26. The method of claim 24 including performing a calibration step by applying a known force to the coating material and measuring an optical measurement value corresponding to the known force.

27. The method of claim 24 wherein the step of obtaining a thickness measurement value comprises measuring a luminescent output from the coating material.

* * * * *

UNITED STATES PATENT AND TRADEMARK OFFICE
CERTIFICATE OF CORRECTION

PATENT NO. : 7,127,950 B2
APPLICATION NO. : 10/981927
DATED : October 31, 2006
INVENTOR(S) : Fonov et al.

It is certified that error appears in the above-identified patent and that said Letters Patent is hereby corrected as shown below:

Col. 5, equation (2):

$$\text{``} \int_\Omega [\mu \epsilon_{ij}(\vec{v})\epsilon_{ij}(\vec{w}) + \lambda \epsilon_{ii}(\vec{v})\epsilon_{jj}(\vec{w})] d\vec{w} = \int_{106}(\vec{g}\cdot\vec{w}) d\vec{w} + \int(\vec{h}\cdot\vec{w})d\vec{w}, \forall \vec{w} \in V \text{''} \quad (2)$$

should be $$\text{--} \int_\Omega [\mu \epsilon_{ij}(\vec{v})\epsilon_{ij}(\vec{w}) + \lambda \epsilon_{ii}(\vec{v})\epsilon_{jj}(\vec{w})] d\vec{w} = \int_\Omega (\vec{g}\cdot\vec{w}) d\vec{w} + \int_\Omega (\vec{h}\cdot\vec{w})d\vec{w}, \forall \vec{w} \in V \quad (2) \text{ --.}$$

Col. 7, line 63 "will be function" should read --will be a function--;

Col. 8, line 7, "for high spaial resolution" should read --for high spatial resolution--;

Col. 9, line 66, "shear displacement field" should read --shear displacement fields--;

Col. 15, Claim 20, line 6, "using the ratio $(I_{a1} I_{b0}/I_{a0}I_{b1)}.$" should read --using the ratio $(I_{a1}I_{b0}/I_{a0}I_{b1})$.--.

Col. 6, equation (5):

$$\text{``} \tilde{n}_s(x) = \left[ \frac{1}{x \exp(-|x|/k3)} \right] \cdot [a_3 \quad a_4] \quad (5) \text{''}$$

should be $$\text{--} \tilde{n}_s(x) = \left[ \frac{1}{x \exp(-|x|/k3)} \right] \cdot [a_3 \quad a_4] \quad (5) \text{ --}$$

UNITED STATES PATENT AND TRADEMARK OFFICE
CERTIFICATE OF CORRECTION

PATENT NO. : 7,127,950 B2
APPLICATION NO. : 10/981927
DATED : October 31, 2006
INVENTOR(S) : Fonov et al.

It is certified that error appears in the above-identified patent and that said Letters Patent is hereby corrected as shown below:

Col. 6, equation (6):

$$\text{``} \quad \tilde{s}_n(x) = \begin{bmatrix} 1 \\ x \exp(-|x|/t1 \end{bmatrix} \cdot [b_1 \quad b_2] \qquad (6) \quad \text{''}$$

should be $$-- \quad \tilde{s}_n(x) = \begin{bmatrix} 1 \\ x \exp(-|x|/t1) \end{bmatrix} \cdot [b_1 \quad b_2] \qquad (6) \quad --.$$

Signed and Sealed this

Twenty-third Day of September, 2008

JON W. DUDAS
*Director of the United States Patent and Trademark Office*